(12) United States Patent
Yang et al.

(10) Patent No.: US 8,477,486 B2
(45) Date of Patent: Jul. 2, 2013

(54) LINKAGE MECHANISM AND ELECTRONIC DEVICE USING SAME

(75) Inventors: Zhen-Yu Yang, Shenzhen (CN);
Lian-Cheng Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 188 days.

(21) Appl. No.: 13/210,567

(22) Filed: Aug. 16, 2011

(65) Prior Publication Data

US 2012/0188703 A1 Jul. 26, 2012

(30) Foreign Application Priority Data

Jan. 21, 2011 (CN) .......................... 2011 1 0024424

(51) Int. Cl.
*E05D 3/06* (2006.01)
(52) U.S. Cl.
USPC ............ 361/679.27; 16/286; 16/302; 16/303; 16/330; 16/334; 16/362; 16/366; 16/368

(58) Field of Classification Search
USPC ................. 361/679.27–679.29; 16/286, 302, 16/303, 330, 334, 362, 366, 368
See application file for complete search history.

(56) References Cited

U.S. PATENT DOCUMENTS

| | | | |
|---|---|---|---|
| 2010/0053877 A1* | 3/2010 | Hsu et al. | 361/679.27 |
| 2010/0073857 A1* | 3/2010 | Lin et al. | 361/679.27 |

* cited by examiner

*Primary Examiner* — Ramon Barrera
(74) *Attorney, Agent, or Firm* — Altis Law Group, Inc.

(57) ABSTRACT

A linkage mechanism includes a fixing member, a rotary member, a support member and a sliding module. A first end of the rotary member is rotatably assembled to the fixing member. A first end of the support member is rotatably hinged to the second end of the rotary member, and the second end of the support member is hinged with the sliding module. The sliding module includes a sliding member and a sliding rod slidably assembled to the sliding member. The sliding member is slidably mounted to the fixing member, and further hinged to the second end of the support member. The sliding member defines a sliding hole. The sliding rod is rotatably assembled to the rotary member together with the fixing member, and further slidably passing through the sliding hole of the sliding member. An electronic device using the linkage mechanism is also provided.

20 Claims, 5 Drawing Sheets

LINKAGE MECHANISM AND ELECTRONIC DEVICE USING SAME

BACKGROUND

1. Technical Field

The present disclosure generally relates to linkage mechanisms, and more particularly to a linkage mechanism and an electronic device using the same.

2. Description of Related Art

A typical foldable electronic device, such as a notebook computer or a mobile phone, often includes a main body, a display screen, and a linkage mechanism foldably connecting the main body and the display screen together. The existing linkage mechanism generally adopts a four-bar linkage mechanism. In use, the display screen of the electronic device is capable of rotating and sliding relative to the main body of the electronic device via the linkage mechanism. However, the existing linkage mechanism has a poor structure, and is easily worn out.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
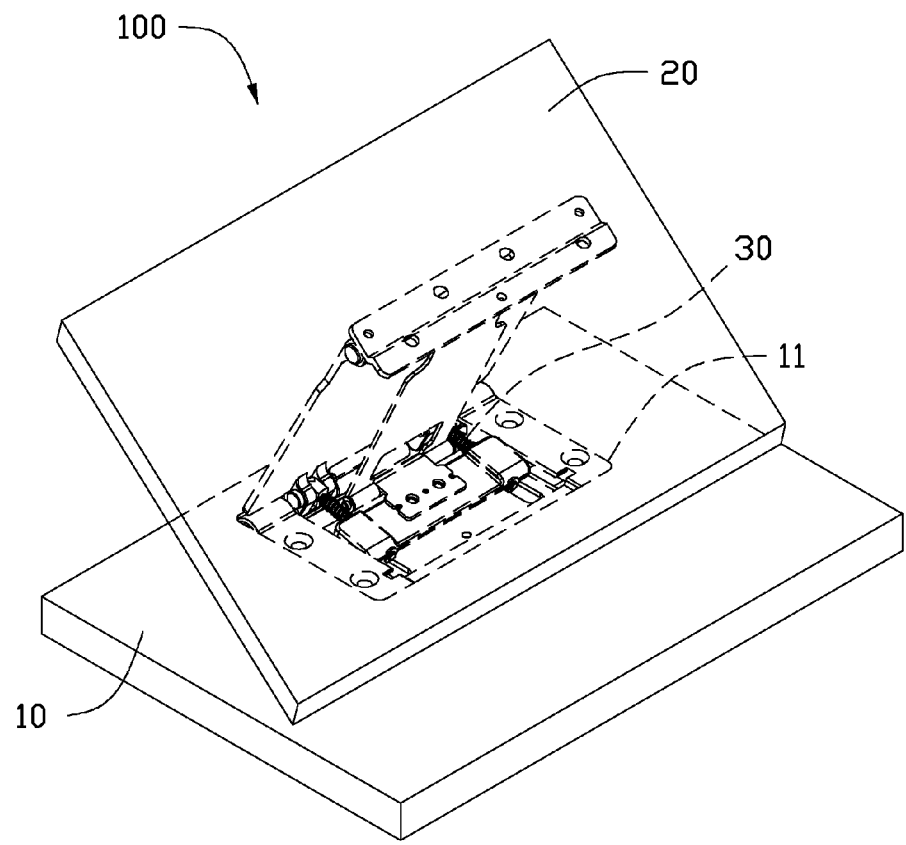
FIG. 1 shows an assembled, isometric view of one embodiment of an electronic device in one position during use, the electronic device includes a linkage mechanism, a main body, and a display screen.

Referring to FIG. 1, an embodiment of a foldably electronic device 100 is shown. The electronic device 100 includes a main body 10, a display screen 20, and a linkage mechanism 30 foldably connecting the main body 10 and the display screen 20 together. The electronic device 100 can be any foldable device such as a notebook computer, a tablet computer, or a mobile phone. In the illustrated embodiment, the main body 10 and the display screen 20 are both substantially rectangular-shaped. The display screen 20 is capable of rotating and sliding relative to the main body 10 of the electronic device 100 via the linkage mechanism 30, thereby opening the display screen 20 of the electronic device 100 to form a viewing angle relative to the main body 10, and closing the display screen 20 to cover the main body 10.

The main body 10 can be a substantially rectangular support base with a keypad disposed (not shown) on an upper surface thereof. An assembly recession 11 is recessed into the upper surface of the main body 10 and positioned adjacent to one side edge of the main body 10.

Figure 2:
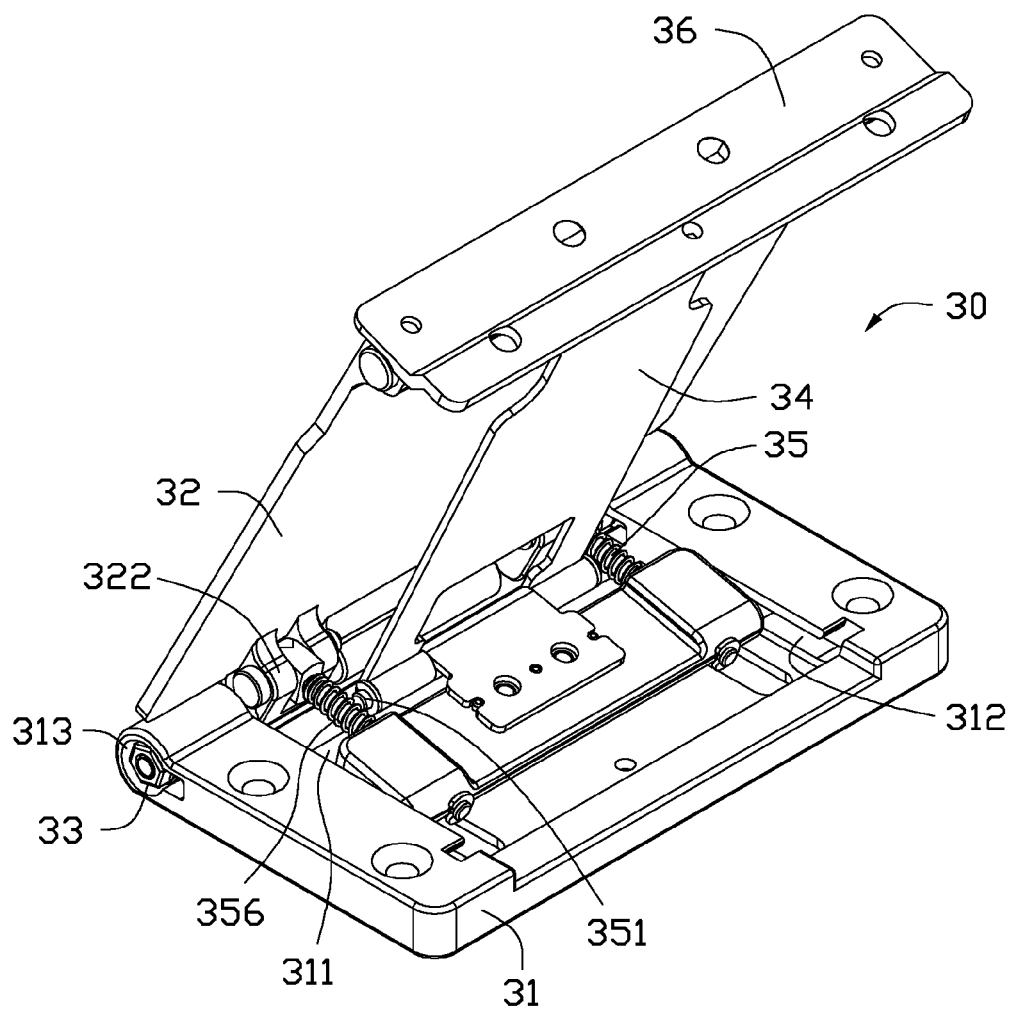
FIG. 2 shows an assembled, isometric view of the linkage mechanism of FIG. 1.
Figure 3:
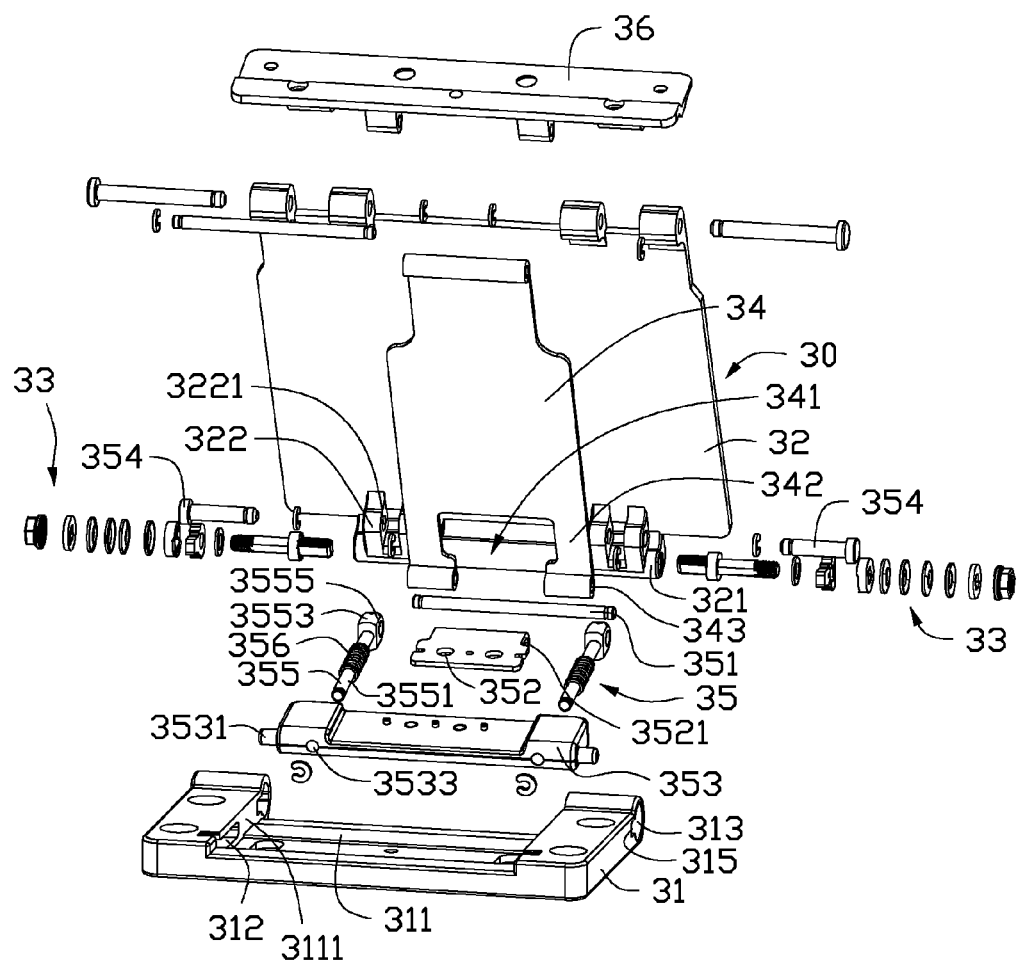
FIG. 3 shows an exploded, isometric view of the linkage mechanism of FIG. 2.

Also referring to FIGS. 2 and 3, the linkage mechanism 30 includes a fixing member 31, a rotary member 32, two hinge assemblies 33, a support member 34, a sliding module 35, and a connecting member 36. The fixing member 31 is fixedly assembled within the assembly recession 11 of the main body 10. A first end of the rotary member 32 is rotatably assembled to the fixing member 31 via the two hinge assemblies 33, and further rotatably hinged with the sliding module 35. A second end of the rotary member 32 opposite to the first end is rotatably assembled with the connecting member 36. A first end of the support member 34 is rotatably hinged with the sliding module 35 and is further slidably assembled to the fixing member 31 via the sliding module 35. A second end of the support member 34 is also rotatably hinged to the connecting member 36. The connecting member 36 is further fixed with the display screen 20, such that the display screen 20 is rotatably and slidably mounted to the main body 10 via the linkage mechanism 30.

The fixing member 31 can be substantially rectangular-shaped, and is fixedly received within the assembly recession 11 of the main body 10. A substantially U-shaped receiving recession 311 is recessed into a middle portion of an upper surface (not labeled) of the fixing member 31, and is positioned away from the main body 10. Two guiding slots 312 are respectively defined in two opposite sidewalls 3111 of the receiving recession 311, and positioned adjacent to a first end of the fixing member 31. Two pivotal holes 313 are respectively defined through the two opposite sidewalls 3111 of the receiving recession 311 of the fixing member 31, and positioned adjacent to a second end of the fixing member 31. Two positioning slots 315 are oppositely defined in the two sidewalls 3111 and communicate with the two pivotal holes 313, respectively.

The rotary member 32 is a substantially rectangular board, and includes two hinged portions 321 separately formed on a first end of the rotary member 32, and two sleeve portions 322 oppositely formed and adjacent to the two hinged portions 321, respectively. Each sleeve portion 322 defines a sleeve hole 3221.

Figure 4:
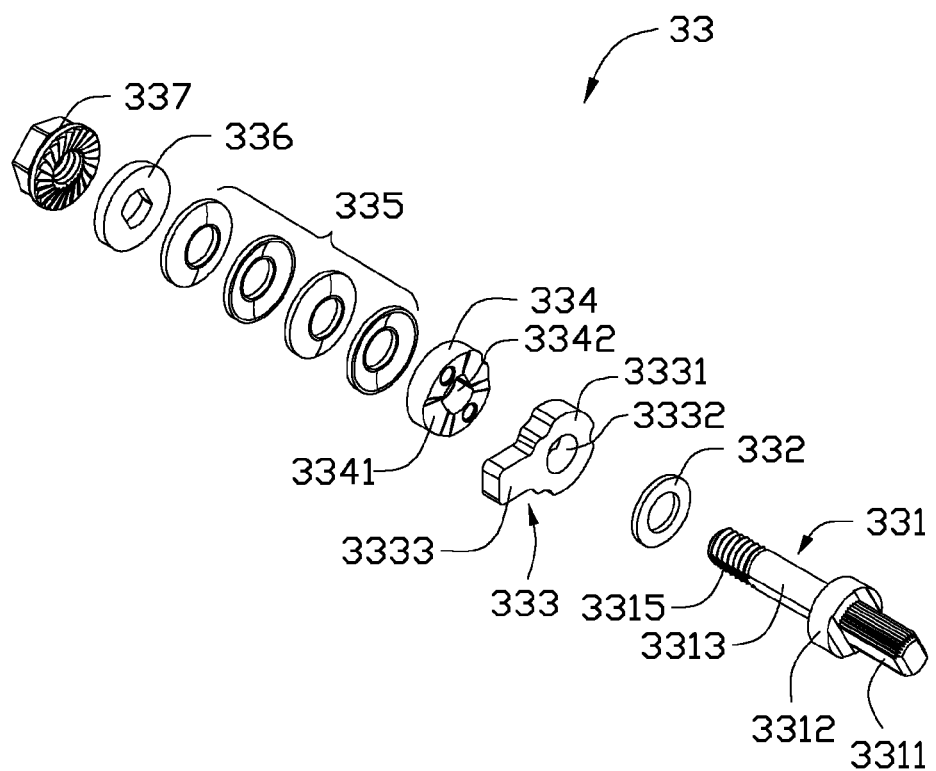
FIG. 4 shows an exploded, isometric view of a hinge assembly of the linkage mechanism of FIG. 3.
Figure 5:
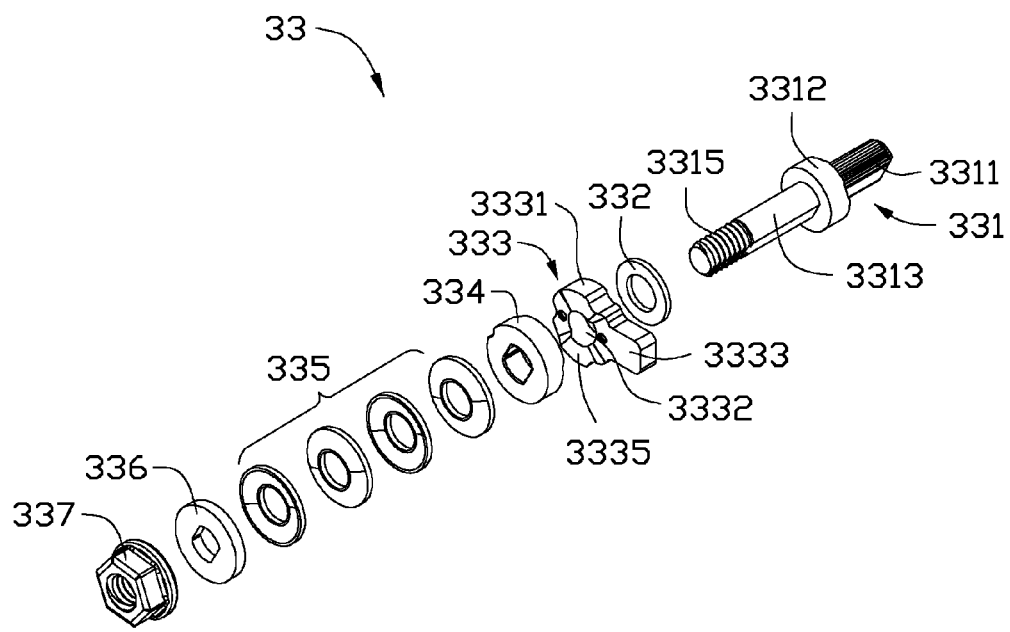
FIG. 5 is similar to FIG. 4, but viewed from another aspect.

Also referring to FIGS. 4 and 5, each of the two hinge assemblies 33 includes a rotary shaft 331, a first washer 332, a cam 333, a cam follower 334, a resilient assembly 335, a second washer 336, and a fastener 337. The rotary shaft 331 is a non-circular shaft in the present embodiment, and includes a fixing shaft portion 3311, a mounting shaft portion 3313 coaxially connecting with the fixing shaft portion 3311, and a substantially circular flange 3312 coaxially disposed at a joint of the fixing shaft portion 3311 and the mounting shaft portion 3313. The fixing shaft portion 3311 of the rotary shaft 331 is fixed to one corresponding hinged portion 321 of the rotary member 32, the mounting shaft portion 3313 of the rotary shaft 331 is rotatably assembled within one corresponding pivotal hole 313 of the fixing member 31. A distal end of the mounting shaft portion 3313 of the rotary shaft 331 defines an outer screw portion 3315. The first washer 332, the cam 333, the cam follower 334, the resilient assembly 335, and the second washer 336 are sleeved on the rotary shaft 331 in that order. The fastener 337 is fixed to the distal end of the mounting shaft portion 3313 of the rotary shaft 331 such that the first washer 332, the cam 333, the cam follower 334, the resilient assembly 335, and the second washer 336 can be tightly sandwiched between the fastener 337 and the flange 3312.

In the illustrated embodiment, the cam 333 is rotatably sleeved on the rotary shaft 331 together with the first washer 332, and is non-rotatably assembled within the pivotal hole 313 of the fixing member 31 such that the rotary shaft 331 is capable of rotating relative to the fixing member 31. The cam 333 includes a substantially disc-shaped cam body 3331 and a positioning block 3333 extending from a periphery of the cam body 3331 for latching into the corresponding positioning slot 315 of the fixing member 31. A circular shaped through hole 3332 is defined through the cam body 3331, and two convex portions 3335 are separately formed on an end surface of the cam body 3331.

The cam follower 334 is non-rotatably sleeved on the rotary shaft 331 and rotatably engages with the cam 333, thereby enabling the rotary shaft 331 together with the rotary member 32 to rotate relative to the cam 33 and the fixing member 31. In the illustrated embodiment, the cam follower 334 is substantially disc-shaped and has a non-circular shaped through hole 3342 defined therethrough, and further defines two concave portions 3341 on a surface of the cam follower 334 for engaging with the corresponding two convex portions 3335 of the cam 333.

The resilient assembly 335 is sleeved on the rotary shaft 331 and elastically resists against the cam follower 334, thereby providing an axial elastic force to the cam follower 334. In the illustrated embodiment, the resilient assembly 335 includes four disk-shaped elastic washers.

The second washer 336 has a shape similar to that of the first washer 332, and is non-rotatably sleeved on the rotary shaft 331 such that the resilient assembly 335, the cam follower 334, the cam 333, and the first washer 332 are sleeved on the rotary shaft 331 together, and are sandwiched between the second washer 336 and the flange 3312 of the rotary shaft 331.

The fastener 337 is a nut in the illustrated embodiment, and is fixedly secured to the distal end of the mounting shaft portion 3313 of the rotary shaft 331.

Referring to FIG. 3 again, the support member 34 is a substantially rectangular plate. A first end of the support member 34 defines a substantially U-shaped cutout 341, thereby forming two parallel hinged arms 342. A distal end of each hinged arm 342 is coiled to form a substantially hollow cylindrical pivotal portion 343. The pivotal portion 343 defines a hinged hole (not labeled) for rotatably hinging to the sliding module 35. The second end of the rotary member 32 is rotatably hinged with the connecting member 36 and the second end of the support member 34.

The sliding module 35 includes a pivotal shaft 351, a securing member 352, a sliding member 353, two connecting rods 354, two sliding rods 355, and two elastic members 356. The securing member 352 is a substantially rectangular plate having substantially the same shape as that of the cutout 341 of the support member 34 such that the securing member 352 can be received in the cutout 341 of the support member 34, and the whole linkage mechanism 30 is in a closed mode. A first end of the securing member 352 is coiled to form a substantially hollow cylindrical hinged end 3521 coaxial with the two pivotal portions 343 of the support member 34. The hinged end 3521 of the securing member 352 is hinged to the support member 34 via the pivotal shaft 351, and is sandwiched between the two hinged arms 342. The opposite end of the securing member 352 is fixed to the sliding member 353.

The sliding member 353 is substantially rectangular-shaped and slidably assembled within the receiving recession 311 of the fixing member 31. Two guiding posts 3531 are oppositely formed on two ends of the sliding member 353, and slidably engaged into the corresponding two guiding slots 312 of the fixing member 31. In the illustrated embodiment, the sliding direction of the sliding member 353 is perpendicular to the pivotal shaft 351. Two sliding holes 3533 are oppositely defined through the sliding member 353 along a direction perpendicular to the longitudinal direction of the sliding member 353, and are positioned adjacent to two ends of the sliding member 353, respectively.

The two sliding rods 355 are oppositely and rotatably hinged to the two sleeve portions 322 of the rotary member 32 via the two connecting rods 354, and positioned adjacent to two sides of the support member 34, respectively. The two sliding rods 355 are further slidably assembled to the sliding member 353 by passing through and partially received within the two sliding holes 3533 of the sliding member 353. In the illustrated embodiment, each sliding rod 355 is substantially T-shaped. Each sliding rod 355 includes a rod portion 3551 and a hinged block 3553 formed at a distal end of the rod portion 3551. The hinged block 3553 defines a through hole 3555 for facilitating the sliding rod 355 to be connected to the sleeve portion of the rotary member 32.

The two elastic members 356 are two coil springs in the illustrated embodiment and are sleeved on the two corresponding sliding rods 355, respectively.

The connecting member 36 is rotatably assembled to the second end of the rotary member 32, and is further rotatably assembled with the second end of the support member 34.

Referring to FIGS. 2 and 3 again, when assembling the linkage mechanism 30, the fixing member 31 is first rotatably assembled to the first end of rotary member 32 via the two hinge assemblies 33. The connecting member 36 is rotatably hinged to the opposite second end of the rotary member 32 opposite to the fixing member 31. The two sliding rods 355 are oppositely and rotatably hinged to the two sleeve portions 322 of the rotary member 32 via the two connecting rods 354. The two elastic members 356 are sleeved on the corresponding two sliding rods 355, respectively. The sliding member 353 is slidably sleeved on the two sliding rods 355 and further slidably assembled to the fixing member 31 and received within the receiving recession 311 of the fixing member 31. The two rod portions 3551 of the two sliding rods 355 parallely pass through the two sliding holes 3533 of the sliding member 353, respectively. The two guiding posts 3531 of the sliding member 353 are slidably engaged into the corresponding two guiding slots 312 of the fixing member 31, respectively. The securing member 352 is fixed to the sliding member 353, and is further hinged to the support member via the pivotal shaft 351, and positioned between the two pivotal portions 343 of the support member 34. Finally, the second end of the support member 34 is rotatably hinged to the connecting member 36 together with the second end of the rotary member 32, to finish the assembly of the linkage mechanism 30.

Also referring to FIG. 1, when assembling the electronic device 100, the fixing member 31 of the linkage mechanism 30 is fixed to and received within the assembly recession 11 of the main body 10. The display screen 20 is then fixed to the connecting member 36 to finish the electronic device 100, such that, the display screen 20 is rotatably and slidably assembled to the main body 10 via the linkage mechanism 30. When the electronic device 100 is in a closed mode, the display screen 20 is folded and covered on the main body 10.

In use, the display screen 20 together with the connecting member 36 slide relative to the main body 10, and an outer force is applied to rotate the display 20 relative to the main body 10. The rotary member 32 and the support member 34 together with the display screen 20 and the connecting member 36 are rotated relative to the fixing member 31, until the rotary member 32 forms a preset acute angle relative to the fixing member 31 and the main body 10. Meanwhile, the sliding member 351 together with the first end of the support member 34 slides relative to the fixing member 31, thereby urging the support member 34 to rotate relative to the connecting member 36 and the rotary member 32. Lastly, the support member 34 forms a preset supporting angle relative to the fixing member 31 for supporting the rotary member 32. The display screen 20 is rotated relative to the rotary member 32 and the support member 34, and abuts against the support member 34 to form a preset perfect viewing angle.

The electronic device 100 is more durable by employing the present linkage mechanism 30 to connect the display screen 20 and the main body 10 together. The display screen 20 of the electronic device 100 can be rotated and slide relative to the main body 10 to obtain a preset perfect viewing angle, as in use. By means of the support member 34, the display screen 20 of the electronic device 100 can be firmly supported, thereby enhancing the performance of the electronic device 100 and elongating the lifetime of the electronic device 100.

It is to be understood that the connecting member 36 may be omitted in other embodiments such that the display screen 20 is directly hinged to the second end of the rotary member 32.

It is to be understood that, the fixing member 31 may be integrally formed with the main body 10. The number of the hinge assembly 33 can be one, namely, the rotary member 32 is hinged to the fixing member 31 by one hinge assembly 33. Correspondingly, the fixing member 31 defines one pivotal hole 313 for assembling the one hinge assembly 33.

It is to be understood that, the number of the connecting rods 354, the sliding rods 355, and the elastic members 356 of the sliding module 35 is not limited to two, it can also be one. If so, the sliding module 35 includes a pivotal shaft 351, a securing member 352, a sliding member 353, a connecting rod 354, a sliding rod 355, and an elastic member 356. Correspondingly, the sliding member 353 defines one sliding hole 3533 for assembling the one sliding rod 355.

It is to be understood that, the pivotal shaft 351 and the securing member 352 of the sliding module 35 may be omitted in an alternative embodiment such that the sliding member 353 is directly hinged to the support member 34.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A linkage mechanism, comprising:
   a fixing member;
   a rotary member having a first end rotatably assembled to the fixing member, and a second end opposite the first end;
   a support member rotatably having a first end hinged to the second end of the rotary member; and
   a sliding module comprising:
      a sliding member slidably mounted to the fixing member and rotatably connected to a second end of the support member, the sliding member defining a sliding hole; and
      a sliding rod rotatably assembled to the rotary member together with the fixing member, and slidably passing through the sliding hole of the sliding member.

2. The linkage mechanism of claim 1, wherein the sliding rod comprises a rod portion and a hinged block formed at one distal end of the rod portion, the hinged block is hinged to the rotary member; the sliding module further comprises an elastic member sleeved on the rod portion of the sliding rod, and elastically sandwiched between the hinged block and the sliding member.

3. The linkage mechanism of claim 1, wherein the fixing member defines a receiving recession recessed from an upper surface thereof, and comprises two guiding slots oppositely defined in opposite sidewalls of the receiving recession; the sliding member comprises two guiding posts oppositely formed on two ends thereof; the two guiding posts slidably engage with the corresponding two guiding slots of the fixing member, respectively.

4. The linkage mechanism of claim 3, wherein the fixing member further defines a pivotal hole; the rotary member forms a hinged portion on a first end thereof corresponding to the pivotal hole; the linkage mechanism further comprises a hinge assembly assembled within the pivotal hole of the fixing member and mounted to the hinged portion of the rotary member, thereby rotatably hinging the rotary member and the fixing member together.

5. The linkage mechanism of claim 4, wherein the hinge assembly includes a rotary shaft, a cam, a cam follower, and a resilient assembly; a first end of the rotary shaft is fixed to the hinged portion of the rotary member; the cam is rotatably sleeved on the rotary shaft and non-rotatably assembled within the pivotal hole of the fixing member; the cam follower is non-rotatably sleeved on the rotary shaft and engages with the cam, the resilient assembly is sleeved on the rotary shaft and elastically resists against the cam follower.

6. The linkage mechanism of claim 5, wherein the hinge assembly further comprises a fastener fixed to the distal end of the rotary shaft and resists against the resilient assembly.

7. The linkage mechanism of claim 6, wherein the rotary shaft is a non-circular shaft, and includes a fixing shaft portion, a mounting shaft portion coaxially connecting with the fixing shaft portion, and a flange coaxially disposed at a joint of the fixing shaft portion and the mounting shaft portion; the fixing shaft portion of the rotary shaft is fixed to the hinged portion of the rotary member; the mounting shaft portion of the rotary shaft is rotatably assembled within the pivotal hole of the fixing member; the cam, the cam follower and the resilient assembly are sleeved on the mounting shaft portion of the rotary shaft in that order.

8. The linkage mechanism of claim 7, wherein the hinge assembly further comprises a first washer and a second washer, the first and second washers both sleeved on the mounting shaft portion of the rotary shaft; the first washer is sandwiched between the flange and the cam; the second washer is sandwiched between the fastener and the resilient assembly.

9. The linkage mechanism of claim 6, wherein the cam includes a cam body and a positioning block extending from the cam body, to prevent the cam from rotating within the pivotal hole of the fixing member; the cam body forms two convex portions separately formed on one cross sectional surface thereof; the cam follower is substantially disc shaped, and defines two concave portions for rotatably engaging with the corresponding two convex portions of the cam.

10. The linkage mechanism of claim 2, wherein a second end of the support member defines a substantially U-shaped cutout, thereby forming two parallel hinged arms; the sliding module further comprises a pivotal shaft and a securing member; the securing member is received within the cutout of the support member, and is hinged to the support member via the pivotal shaft; the securing member is further fixed to the sliding member.

11. An electronic device, comprising:
    a main body;
    a display screen; and
    a linkage mechanism foldably connecting the main body and the display screen together; the linkage mechanism comprising:
       a fixing member fixed to the main body;

a rotary member having a first end rotatably assembled to the fixing member, and an opposite second end hinged to the display screen;
a support member rotatably having a first end hinged to the second end of the rotary member; and
a sliding module comprising:
a sliding member slidably mounted to the fixing member and hinged to the second end of the support member, the sliding member defining a sliding hole; and
a sliding rod rotatably assembled to the rotary member together with the fixing member, and slidably passing through the sliding hole of the sliding member.

12. The electronic device of claim 11, wherein the linkage mechanism further comprises a connecting member hinged to the second end of the rotary member, and rotatably hinged to the second end of the support member; the display screen is fixed to the connecting member.

13. The electronic device of claim 11, wherein the sliding rod comprises a rod portion and a hinged block formed at one distal end of the rod portion; the hinged block is hinged to the rotary member; the sliding module further comprises an elastic member sleeved on the rod portion of the sliding rod, and elastically sandwiched between the hinged block and the sliding member.

14. The electronic device of claim 11, wherein the fixing member defines a receiving recession recessed from an upper surface thereof, and comprises two guiding slots oppositely defined in two opposite sidewalls of the receiving recession; the sliding member comprises two guiding posts oppositely formed on two ends thereof; the two guiding posts slidably engage with the corresponding two guiding slots of the fixing member, respectively.

15. The electronic device of claim 14, wherein the fixing member further defines a pivotal hole, the rotary member forms a hinged portion on a first end thereof, corresponding to the pivotal hole; the linkage mechanism further comprises a hinge assembly assembled within the pivotal hole of the fixing member and mounted to the hinged portion of the rotary member, thereby rotatably hinging the rotary member with the fixing member.

16. The electronic device of claim 15, the hinge assembly includes a rotary shaft, a cam, a cam follower, and a resilient assembly; a first end of the rotary shaft is fixed to the hinged portion of the rotary member; the cam is rotatably sleeved on the rotary shaft and non-rotatably assembled within the pivotal hole of the fixing member; the cam follower is non-rotatably sleeved on the rotary shaft and engages with the cam, the resilient assembly is sleeved on the rotary shaft and elastically resists against the cam follower.

17. The electronic device of claim 16, wherein the hinge assembly further comprises a fastener fixed to the distal end of the rotary shaft and resists against the resilient assembly.

18. The electronic device of claim 17, wherein the rotary shaft is a non-circular shaft, and includes a fixing shaft portion, a mounting shaft portion coaxially connecting with the fixing shaft portion, and a flange coaxially disposed at a joint of the fixing shaft portion and the mounting shaft portion; the fixing shaft portion of the rotary shaft is fixed to the hinged portion of the rotary member, the mounting shaft portion of the rotary shaft is rotatably assembled within the pivotal hole of the fixing member; the cam, the cam follower and the resilient assembly are sleeved on the mounting shaft portion of the rotary shaft in that order.

19. The electronic device of claim 18, wherein the hinge assembly further comprises a first washer and a second washer; the first and second washer are both sleeved on the mounting shaft portion of the rotary shaft; the first washer is sandwiched between the flange and the cam; the second washer is sandwiched between the fastener and the resilient assembly.

20. The electronic device of claim 14, wherein the main body comprises an assembly recession recessed from the upper surface thereof and positioned adjacent to one side edge of the main body; the fixing member is fixedly assembled within the assembly recession of the main body.

* * * * *